Patented May 11, 1954 2,678,275

UNITED STATES PATENT OFFICE 2,678,275

DEVELOPER COMPOSITION FOR LITHOGRAPHIC PLATES

Robert M. Leekley, Westport, Conn., assignor, by mesne assignments, to Printing Developments, Inc., New York, N. Y., a corporation of New York No Drawing. Application November 22, 1950, Serial No. 197,167

12 Claims. (Cl. 95—88)

This invention relates to a developer composition for use in connection with bimetal lithographic plates having a chromium surface and coated with a photosensitive gum-bichromate emulsion.

There recently has come into use a bimetal lithographic plate having a chromium surface plated on a copper base and coated with a photosensitive gum emulsion. This emulsion is of conventional type and is soluble in aqueous metal chloride solution prior to exposure to light, but becomes insoluble in this solution after exposure to light. In the preparation of the plate for printing, the plate is exposed to light passed through the material to be copied, and the light-unexposed soluble portions of the photosensitive gum emulsion dissolved by metal chloride developer solution, thus producing a latent negative image on the plate. Next, the portions of the chromium surface on the plate which have been exposed by solution of the emulsion are attacked by an etch solution to expose the copper base plate, and then the remainder of the emulsion is removed. The negative image on the plate is thus converted into a positive image, and the plate is ready for use.

The metal chloride developer solution commonly employed to dissolve the light-unexposed portion of the emulsion contains zinc chloride and/or calcium chloride and a small amount of lactic acid. However, this developer solution is capable of etching chromium, and in the preparation of the plate after the developer has dissolved the soluble portions of the emulsion frequently it begins to attack the chromium surface of the plate. This produces no difficulty if the plate is free from defects, since the chromium surface is removed later by the etch solution. However, from time to time a defective image is obtained, and a new plate must be prepared. In this event, if the developer has not etched the chromium surface, the plate can be recoated with photosensitive gum emulsion and reused. On the other hand, if the developer has etched the chromium, the first image is permanently registered on the plate, and if the plate is used again a double image will appear and cause double printing. Such a plate must be replated with chromium before it can be used again.

Accordingly, it is an object of the present invention to provide a metal chloride developer composition for use with chromium-surfaced bimetal lithographic plates which will dissolve light-unexposed portions of the photosensitive gum-bichromate emulsion thereof without attacking the chromium surface.

This object is achieved by incorporating urea in the metal chloride developer composition.

Urea inhibits etching of chromium by the developer and also has unexpectedly been found to increase the rate of development and to make the development more uniform over the entire surface of the plate.

The developer composition of the invention contains as essential ingredients a chloride of a metal selected from group II of the periodic table, such as magnesium chloride, strontium chloride, zinc chloride or calcium chloride or a mixture thereof, and urea. A small amount of lactic acid, hydroxyacetic acid or like weak acid is also included.

The developer composition is employed as an aqueous solution and may be prepared initially in this form. Concentrated solutions of the order of 40 to 70% solids are used. However, for convenience in handling, if the composition is to be transported or placed in commerce it may be formed by admixture of the dry ingredients, which composition forms a satisfactory developer solution when dissolved in water.

The amount of urea in the composition is determined on the one hand by the amount required to inhibit etching of chromium by the composition and on the other hand by the desired rate of development. In order to inhibit etching of chromium, at least about 5% urea by weight of the aqueous solution of the composition should be present. At this urea concentration, chromium etching will be minimized for about 10 minutes of exposure of the plate to an aqueous solution of the composition. The rate of development increases rapidly as the proportion of urea is increased. At a proportion of 12 to 14% urea, by weight of the solution the rate of development is doubled, while the rate of development of a solution containing 25% urea is approximately 2.5 times that of a conventional developer composition. The upper limit of urea therefore depends upon the rate of development desired by the user. Ordinarily not over 25% urea by weight of the solution is indicated, while from 5 to 15% urea is the optimum range.

A typical example of a conventional calcium chloride-zinc chloride developer composition is as follows:

*Table I*

| Material | Weight Basis, lbs. |
|---|---|
| Calcium chloride | 6 |
| Zinc chloride | 3 |
| Lactic Acid (80% Technical Grade) | 1.76 |
| The above is dissolved in— | |
| Water | 8.65 |

This aqueous composition will etch chromium slowly. If to this composition there is added from 2 to 20% urea by weight of the aqueous solution, the rate of development of the composition is increased, as shown in the following table, while attack of chromium by the composition is substantially eliminated:

*Table II*

| Percent Urea (by weight of the solution) | Etching of Chromium Noted [1] | Rate of Development |
|---|---|---|
| 0 (control) | Considerable | 1.0 (assigned value). |
| 2 | Moderate | 1.18. |
| 4 | Slight | 1.18. |
| 6 | None | 1.26. |
| 8 | do | 1.67. |
| 10 | do | 1.67. |
| 12 | do | 2.0. |
| 14 | do | 2.0. |
| 16 | do | 2.0. |
| 18 | do | 2.3. |
| 20 | do | 2.3. |

[1] After ten minutes' exposure.

In the tests performed to obtain the above data, the thickness of the photosensitive gum emulsion, exposure time, and time of development were held constant.

It is evident from the data in the above table that addition of 6 to 9% urea by weight of the solution increases the rate of development by a factor of about 1.5. This rate is not too fast under most conditions, and at this urea concentration chromium etching is fully inhibited.

A very desirable developer composition contains 3 parts calcium chloride, 1.5 parts zinc chloride and about 0.8 part lactic acid for each part of urea. An example of such a composition is as follows:

*Table III*

| Material | Wt. Basis, lbs. | Percent Basis |
|---|---|---|
| Calcium chloride | 6 | 28.2 |
| Zinc chloride | 3 | 14.1 |
| Lactic Acid (80% Technical Grade) | 1.76 | 8.2 |
| Water | 8.65 | 40.2 |
| Urea | 2 | 9.3 |
| | 21.31 | 100 |

The specific gravity of this solution should be 41.5° Bé. at 70° F. The solution may be prepared by dissolving the calcium chloride, zinc chloride and lactic acid in 17 gallons of water, adjusting the specific gravity to 42° Bé. at 70° F. and then adding the urea.

Inasmuch as the developer composition of the invention does not etch chromium, chromium-surfaced copper lithographic plates developed by the composition may be coated and developed innumerable times without destruction of the chromium surface. The developer may be used in conjunction with any type of lithographic plate having a chromium surface, and is particularly useful with chromium-surfaced copper plates, especially those coated with a photosensitive gum-bichromate emulsion.

Numerous modifications may be made in the invention, as will be evident to those skilled in the art.

I claim:

1. A developer composition for use in connection with bimetal lithographic plates having a chromium surface and coated with a photosensitive emulsion, comprising a water-soluble chloride of a metal selected from group II of the periodic table in an amount to dissolve photosensitive emulsion coating which has not been hardened by light and expose the chromium surface of the plate, and urea in an amount of at least about 2% to inhibit etching of the exposed chromium surface by the metal chloride.

2. A developer composition in accordance with claim 1 in which the urea is present in an amount in the range from 5 to 25% by weight of the composition.

3. A developer composition in accordance with claim 1 in which the metal chloride is calcium chloride.

4. A developer composition in accordance with claim 1 in which the metal chloride is zinc chloride.

5. A developer composition in accordance with claim 1 in which the metal chloride is a mixture of zinc chloride and calcium chloride.

6. A developer composition in accordance with claim 1 which also contains lactic acid.

7. A developer composition in accordance with claim 1 which also contains hydroxyacetic acid.

8. A dry developer composition which when dissolved in water is useful in connection with bimetal lithographic plates having a chromium surface and coated with a photosensitive emulsion to dissolve light-unexposed emulsion, comprising a water-soluble chloride of a metal selected from group II of the periodic table, said chloride being present in an amount to dissolve light-unexposed photosensitive emulsion and expose the chromium surface of the plate, and urea in an amount of at least about 2% to inhibit etching of the exposed chromium surface by the metal chloride.

9. An aqueous solution comprising the developer composition of claim 8.

10. A developer composition for use in connection with bimetal lithographic plates having a chromium surface and coated with a photosensitive emulsion, comprising urea and 4.5 parts by weight of a water-soluble chloride of a metal selected from group II of the periodic table to each part of urea.

11. A developer composition in accordance with claim 10, in which the metal chloride comprises 3 parts calcium chloride and 1.5 parts zinc chloride.

12. A developer composition for use in connection with bimetal lithographic plates having a chromium surface and coated with a photosensitive emulsion, comprising urea and 3 parts by weight calcium chloride, 1.5 parts zinc chloride, and 0.8 part lactic acid to each part of urea.

References Cited in the file of this patent

UNITED STATES PATENTS

| Number | Name | Date |
|---|---|---|
| 2,265,829 | Wood | Dec. 9, 1949 |
| 2,419,296 | Solomon | Apr. 22, 1947 |

OTHER REFERENCES

Wood, National Lithographer, vol. 45, No. 5, May 1938, pp. 24–25.

Martindale "Extra Pharmacopia," 21 ed., vol. 1, 1936, publ. Pharmaceutics Press, London, page 58.